Figure 1:
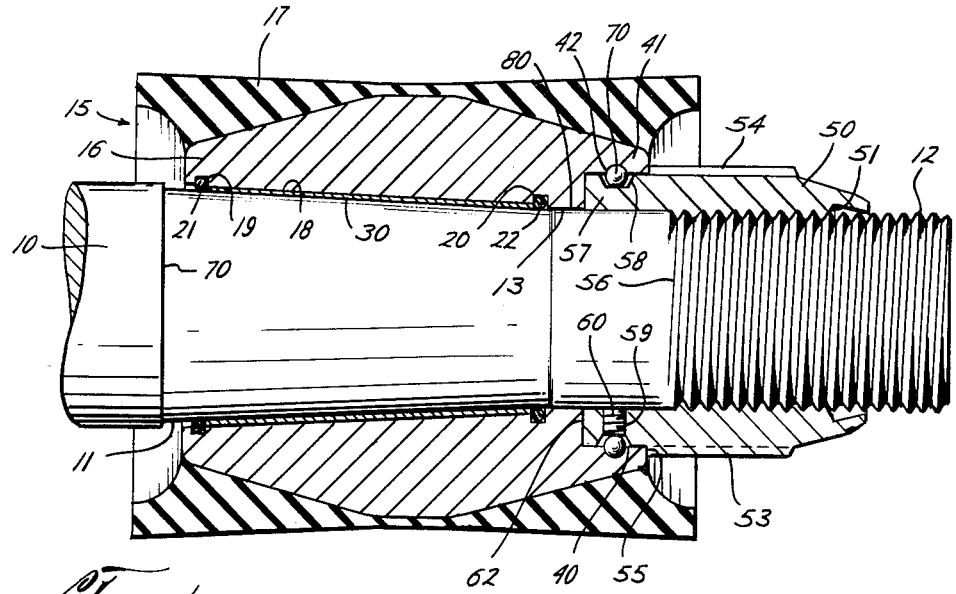

Feb. 1, 1966 W. R. GARRETT ETAL 3,232,186
PISTON AND ROD
Filed March 16, 1964

William R. Garrett
Henry M. Rollins
Jeddy D. Nixon, Jr.
INVENTORS

BY *Muncy Robinson*

ATTORNEY

United States Patent Office 3,232,186
Patented Feb. 1, 1966

3,232,186
PISTON AND ROD
William R. Garrett, Henry M. Rollins, and Jeddy D. Nixon, Jr., Midland, Tex., assignors to Drilco Oil Tools, Inc., Midland, Tex., a corporation of Texas
Filed Mar. 16, 1964, Ser. No. 351,944
16 Claims. (Cl. 92—172)

This invention pertains to pump pistons.

It has heretofore been known to mount a piston on a piston rod by providing the rod near its end with a tapered land and at its extremity with a threaded portion, the piston being provided with a correlatively tapered axial bore whereby it may be pushed up on the tapered land of the rod into tight engagement and one or more nuts screwed onto the extremity of the rod to hold the piston in place. Such an arrangement is shown for example in the expired patents U.S. 1,577,732—Lamb (3–23–26), U.S. 2,189,839—Sharp et al. (2–13–46), when the rubber ring seal means of the piston wears out, the piston may be removed from the rod and either replaced in toto as in the case of the Lamb construction or the seal rings replaced in the Sharp et al. construction.

Some difficulty is experienced in removing the piston from the rod, and a number of means have been devised to facilitate such removal. For example, in expired patents Swiss 164,285—Aktiebolaget Separator (12–1–33), U.S. 1,949,612—Mattair et al. (3–6–34), the piston is connected to a nut engaging the threaded extremity of the rod whereby when the nut is unscrewed the piston comes with it.

In a construction wherein a nut is attached to the piston for the purpose just described, it is apparent that the torque required to turn the nut depends not only on the axial thrust necessary for removing the piston from the rod but also on the torque required to overcome rotational resistance, either between the piston and rod in the case of a construction of the Mattair et al. type, or between the nut and piston in the case of a construction such as shown in the patent to Aktiebolaget Separator.

It is an object of the invention to reduce the aforementioned rotational resistance to turning of the nut, whereby the torque applied to the nut will largely be used in developing axial thrust for removing the piston from the rod. According to the invention, the desired result is accomplished by providing an antifriction thrust bearing between the nut and the piston. This in itself presents a problem in that the thrust bearing must be able to withstand the thrust required to remove the piston from the rod.

It is, therefore, a further object of the invention to reduce the axial thrust needed to remove the piston from the rod. According to the invention this is accomplished by lining the inner surface of the piston hub with a coating of material of moderate shear strength such as lead. It is important that the lining not be of too low a shear strength, such as grease, or when the pump is in use the piston will work its way upon the rod until the piston fails in hoop tension or excessively expands the piston seal rings against the liner. On the other hand if the lining material does not have sufficiently low shear strength the desired function of reducing the thrust required for removing the piston may not be accomplished.

The reduction of the thrust required for removing the piston from the rod has further advantages. If such thrust exceeds the axial loading strength of the threads on the nut and rod, when attempt is made to remove the piston from the rod by turning the nut the threads will strip. The invention thus enables the threaded nut construction to be applied satisfactorily to larger sizes of pistons and rods than has heretofore been practicable.

Figure 2:
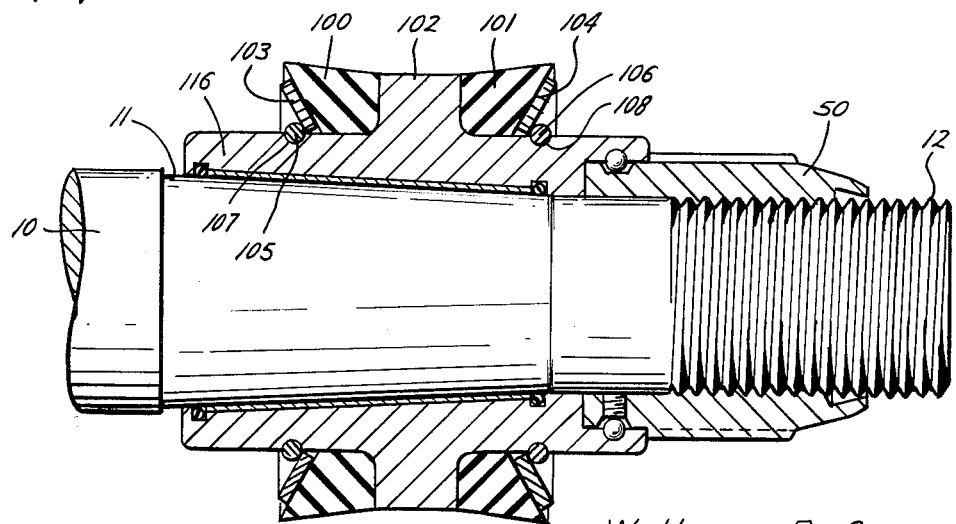

Other objects and advantages of the invention will become apparent from the following detailed description of preferred embodiments thereof, reference being made to the accompanying drawings wherein FIGURE 1 is an axial section through a piston and rod embodying the invention, and FIGURE 2 is a view similar to FIGURE 1 showing a modified form of the invention.

Referring now to FIGURE 1 there is shown a piston rod 10 having a tapered land 11 near the end thereof and a cylindrical base thread 12 on the extremity thereof, with a smooth cylindrical area 13 therebetween.

A piston 15 includes a hub 16 having a rubber seal ring or sleeve 17 bonded to the outer periphery thereof. The hub 16 has an axial tapered bore 18. Adjacent each end of bore 18 are annular grooves 19, 20 within which are disposed rubber O-ring seals 21, 22 sealing between the hub 16 and land 11. Between the grooves 19, 20, the bore 18 is lined with a lead coating 30. Coating 30 is formed by dipping hub 16 into molten lead after first cleaning with acid the part of the hub where the lead coating is desired.

Near the end of hub 16 whereat the bore 18 is of smaller diameter the hub is provided with a larger counter bore 40 forming a neck 41. An internal annular groove 42 is provided in neck 41.

A nut 50 has an internal thread 51 correlative to thread 12 on the rod. Externally the nut is provided with a plurality of axial ribs 53 forming grooves 54 therebetween, adapted for engagement with a wrench or tongs. Ribs 53 terminate at shoulders 55, and the internal thread 51 terminates at 56, leaving a cylindrical neck 57 extending therebeyond. There is an annular external groove 58 around the outer periphery of neck 57. A threaded port 59, normally closed by plug 60, extends inwardly from groove 58 through neck 57.

With the piston and nut off the rod, and plug 60 removed, the neck 57 is inserted into counterbore 40 inside neck 41 until it bears against shoulder 62 at the bottom of the counterbore. This places the grooves 42 and 58 in registry. Steel bearing balls 70 are inserted through port 59 to fill the race formed by grooves 42 and 58. If desired, grease may be pumped into the race. The threaded plug 60 is then screwed into port 59. The hub 16 is then placed on the end of rod 10 and nut 50 screwed on to the rod until the hub is tight on the rod. The bore 18 is of such size that the hub will not engage any shoulder such as 70 which may be present on the rod at the juncture of the large diameter end of the tapered land 11 and the rest of the rod. Since the groove 58 is spaced from balls 70 when the end of neck 57 is against shoulder 62, during assembly of the hub on the rod there is no load on the balls 70 and the race formed by grooves 41 and 58. The ends 55 of ribs 54 may also contact the end of neck 41 to take part of the thrust during assembly.

During use of the piston on the rod in a pump, e.g. a mud pump, the seals 21, 22 will protect the lead coating 30 from the fluid being pumped. The thickness of the coating is so small that any compressive loading thereof due to lateral movement of the piston in the pump cylinder will not permit any substantial lateral displacement of the hub relative to the piston rod. Furthermore, if desired there may be steel to steel contact between hub and rod at the large diameter end of land 11 beyond groove 19. Also, if desired, there may be a close fit between cylindrical portion 13 of the rod and a correlative cylindrical surface 80 provided between groove 30 and shoulder 80. Finally, further lateral stability and support for the piston hub is provided by balls 70 and the interengagement of the necks 41 and 57.

When the piston is to be replaced, it is only necessary to unscrew nut 50. The side of groove 58 engages balls 70 which in turn engage the wall of groove 42 and pull the piston hub 16 off the rod. The balls 70 rotate to largely eliminate sliding friction. The coating 30, having only a moderate shear strength, limits the axial thrust required for removal of the hub to that required to shear the lead coating. After removal of the piston a new piston can be assembled to the rod in the manner previously described. If desired, the old hub and nut may be salvaged and a new rubber seal 17 provided on the hub, or the nut alone can be salvaged and the hub discarded with the worn out seal 17, or the whole piston can be discarded.

FIGURE 2 shows the invention embodied in a piston having seal rings 100, 101 that are separate from the hub so that they can be readily replaced. The seal rings are held on the hub 116 against center flange 102 by annular plates 103, 104 and snap rings 105, 106 in grooves 107, 108 in the manner of the aforementioned Sharp et al. patent. Otherwise, the construction is the same as that of FIGURE 1 so that further description is unnecessary.

Although lead has been described as the preferred material for the coating on the tapered bore of the piston hub, other materials may be used. With lead the coating may be around 0.001 inch thick (plus or minus .001 inch), although thicker and thinner coatings can be used. Other metals and alloys of similar moderate shear strength may be used, for example most solders would be satisfactory. It is desired to avoid having the piston hub freeze on the rod as often occurs with a steel hub on a steel rod. It is also desired to avoid causing the piston to swell up as often occurs with grease between the hub and rod. It is also to be observed that the coating could also be applied to the rod, but for full replaceability the coating is preferably applied to the hub. Wherever applied, other methods of application could be used, for example electroplating. Preferably the coating is metallic.

While preferred embodiments of the invention have been shown and described, modification thereof can be made by one skilled in the art without departing from the spirit of the invention.

That being claimed is:

1. A piston including a steel hub having an axial tapered opening therethrough and a coating of medium shear strength material on the surface of said opening, an internally threaded nut rotatably connected to the piston adjacent the small diameter end of said tapered opening, said nut being connected to said piston by an antifriction thrust bearing, said thrust bearing comprising a neck on said piston having an internal annular groove, a neck on said nut having an external annular groove, said nut neck being telescoped into said piston neck with said grooves in register forming a race, and balls in said race.

2. Combination according to claim 1 wherein said nut neck has a radial threaded port therethrough entering said external groove and through which said balls can be inserted into the race, and a screw plug in said port retaining said balls in said race.

3. A piston including a steel hub having an axial tapered opening therethrough, an internally threaded nut disposed adjacent the small diameter end of said tapered opening and an antifriction thrust bearing rotatably connecting said nut to said piston, said thrust bearing comprising a neck on said piston having an internal annular groove, a neck on said nut having an external annular groove, said nut neck being telescoped into said piston neck with said grooves in register forming a race, and balls in said race.

4. Combination according to claim 3 wherein said nut neck has a radial threaded port therethrough entering said external groove and through which said balls can be inserted into the race, and a screw plug in said port retaining said balls in said race.

5. Combination of claim 1 wherein said hub has a rubber seal ring bonded to the outer periphery thereof.

6. In combination, a steel piston rod having a tapered land and a piston including a steel hub having a tapered opening therethrough, an annular layer of medium shear strength material between said land and opening, said material being a soft metal.

7. Combination of claim 6 where said metal is lead.

8. In combination, a steel piston rod having a tapered land and a piston including a steel hub having a tapered opening therethrough, an annular layer of medium shear strength material between said land and opening, and with O-ring seal between land and opening at at least one end of said layer of material.

9. In combination a steel piston rod having a tapered land and a piston including a steel hub having a tapered opening therethrough, an annular layer of medium shear strength material between said land and opening, and a nut rotatably connected to said piston hub adjacent the small diameter end of said opening and engaged with a thread on the extremity of the rod.

10. Combination of claim 9 wherein said nut is connected to said piston by a ball and race type thrust bearing.

11. Combination of claim 10 wherein said hub has a rubber seal sleeve bonded thereto extending from one end of the hub to the other and said bearing is disposed in a counterbore in one end of said piston.

12. Combination of claim 9 wherein said hub has a radial outer peripheral flange dipsosed between the ends thereof with separate seal rings removably mounted on the hub at each side of the flange, and said piston has a neck extending beyond the seal ring at the end of the hub adjacent the nut, said neck having a counterbore within which said bearing is disposed.

13. Combination of claim 9 wherein said thrust bearing comprises a neck on said piston having an internal annular groove, a neck on said nut having an external annular groove, said nut neck being telescoped into said piston neck, with said grooves in register forming a race, and balls in said race, said nut neck having a radial threaded port therethrough entering said external groove and through which said balls can be inserted into the race when said nut is disconnected from said rod, and a screw plug in said port retaining said balls in said race, said plug being prevented by said rod from coming out of said port when said nut is screwed onto said rod.

14. Combination of claim 13 wherein said piston neck is formed by a counterbore in said hub forming a shoulder at the bottom of the counterbore, and wherein the side of said nut neck groove nearest the rod end is out of contact with said balls when the end of the nut neck is adjacent said shoulder.

15. Combination of claim 14 wherein said nut has axially extending external ribs whose ends bear against the end of the piston hub when the end of the nut neck is adjacent said shoulder.

16. A piston including a steel hub having an opening extending axially therethrough, said opening including a tapered portion adapted to be assembled with a steel piston rod having a tapered land, said tapered portion of the opening through the piston having a layer of medium shear strength material on the surface thereof to contact said land, said material being a soft metal, a nut rotatably connected to said piston hub at the end thereof adjacent the small diameter end of said tapered portion, said nut being connected to said piston by an antifriction thrust bearing, said nut being adapted to engage a thread on the extremity of said piston rod.

References Cited by the Examiner
UNITED STATES PATENTS

| 2,785,025 | 3/1957 | Wilson | 92—251 |
| 3,143,366 | 8/1964 | Nichols | 287—53 |
| 3,155,014 | 11/1964 | Ginz | 92—244 |

FOREIGN PATENTS

| 801,822 | 9/1958 | Great Britain. |
| 164,285 | 12/1933 | Switzerland. |

KARL J. ALBRECHT, *Primary Examiner.*